G. A. LYON.
RESILIENT AUTOMOBILE BUFFER.
APPLICATION FILED FEB. 27, 1920. RENEWED JUNE 18, 1921.
1,386,191.
Patented Aug. 2, 1921.
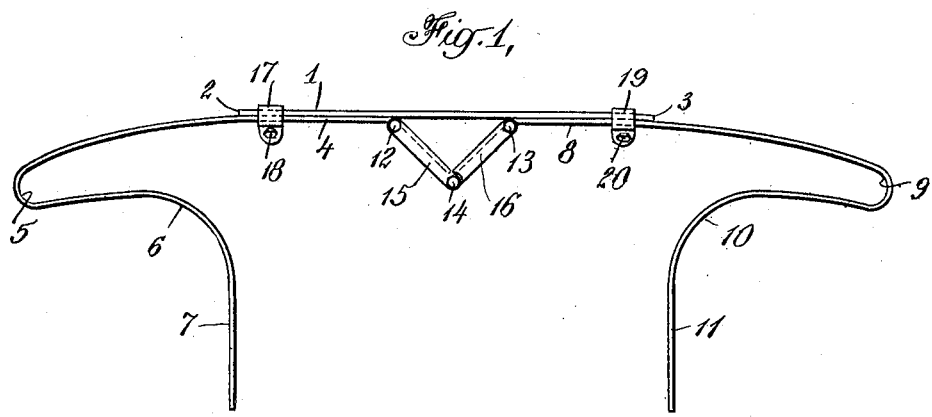
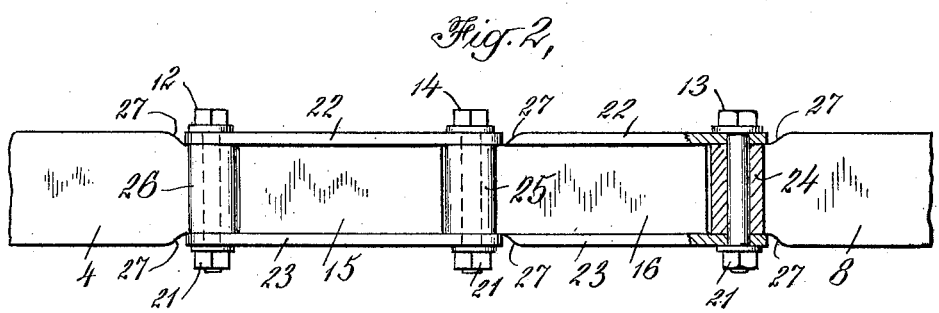
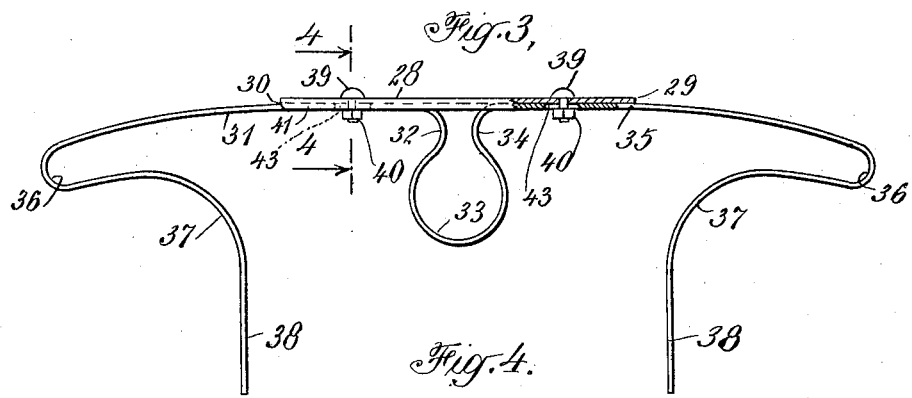
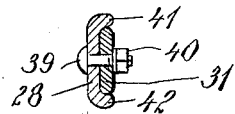

UNITED STATES PATENT OFFICE.

GEORGE ALBERT LYON, OF PHILADELPHIA, PENNSYLVANIA.

RESILIENT AUTOMOBILE-BUFFER.

1,386,191.  Specification of Letters Patent.  Patented Aug. 2, 1921.

Application filed February 27, 1920, Serial No. 361,821. Renewed June 18, 1921. Serial No. 478,719.

*To all whom it may concern:*

Be it known that I, GEORGE ALBERT LYON, a citizen of the United States, and resident of Philadelphia, county of Philadelphia, State of Pennsylvania, have made a certain new and useful Invention Relating to Resilient Automobile-Buffers, of which the following is a specification, taken in connection with the accompanying drawing.

This invention relates especially to resilient buffers for automobiles or other vehicles which may advantageously be formed of resilient strip material such as flat spring steel strip and provided between the end loops or lateral portions of the buffer with a suitably yielding connection which allows the buffer width to be adjusted to suit different width automobile frames while still holding the adjacent parts more or less rigidly in vertical alinement and preventing or minimizing vibration. In some cases a single strip of spring steel may be bent up so as to form the attaching members and end loops of the buffer and intermediate buffer front members which may be formed with one or more integral yieldable resilient loop connections which may extend backward or toward the attaching members so that by forcing these yieldable connections together more or less and clamping or holding the adjacent buffer front members rigidly in adjusted position in connection with a front reinforcing strip or member the parts may be securely and strongly held in such adjusted position. The front reinforcing member or strip, which may, if desired, be of flanged or channel section construction, may extend throughout any desired portion of the buffer front members, preferably including the central part of the buffer and, inclosing clamping devices or preferably clamping or connecting bolts may be used to connect these parts in adjusted position, the bolt shanks passing through a series of spaced bolt holes in one of the members for adjusting purposes, if desired, which promotes the secure holding engagement between these parts.

In the accompanying drawing showing in a somewhat diagrammatic way a number of illustrative embodiments of this invention, Figure 1 is a plan view showing one form of illustrative buffer.

Fig. 2 is an enlarged rear sectional view of part of the yieldable connection thereof.

Fig. 3 is a plan view showing another form of buffer, parts being shown in section; and Fig. 4 is an enlarged transverse section taken along the line 4—4 of Fig. 1.

As indicated in Fig. 1 the illustrative buffer may be formed of resilient strips such as tempered spring steel about two inches wide or so in a vertical direction and one-quarter to three - eighths inch thick more or less. If desired, such spring steel strip may be bent up to form suitable end loops such as 5, 9 which may project into protective position adjacent the vehicle wheels and be supported by the curved yielding portions 6, 10 to which the attaching members 7, 11 of any suitable construction may be integrally or otherwise connected so that they are adapted to be clamped, bolted or otherwise secured to the vehicle frame members, for example. The buffer front members 4, 8 may extend inward from the end loops and be provided with one or more yieldable connections so that they may be forced or moved laterally to adjust the buffer width to suit the automobile or other vehicle to which it is to be attached. For this purpose a yieldable connection may be provided between these two buffer front members or resilient strips and may comprise the coöperating flanged pivoted connector links 15, 16 which may be pivotally secured together as by the clamping connector bolt 14 passing through the ends of the flanges 22, 23 on one of these links and through a coöperating connector socket 25 which may be forged or formed integral on the end of the coöperating link where the edge flanges have been removed or forged down as at 27. Similar integral connector sockets 24, 26 may be formed on the ends of the buffer members 8 and 4 respectively to which may be bolted the connector flanges of these links as by the clamping connector bolts 12, 13 which may tightly engage and clamp the parts when the nuts 21 are screwed home. The entire yieldable or adjustable buffer member may thus form practically a single piece so that loss of the parts is minimized and such permanent connection also contributes to the vertical rigidity of the parts when the adjacent portions of the front members are clamped or connected in adjusted position to a front reinforcing strip or member such as 1, which may have its ends 2, 3, extending outward about as far as the normal distance between the attaching members 7, 11. Any suitable clamping or connecting devices may be used to connect these coöperating parts and the inclosing clamping devices or clips 17 may be used as indicated and tightly clamped upon the front strips or members by the bolts or nuts 18, 20. In assembling such a buffer on an automobile one of the attaching members such as 7 may be clamped to the frame member and then the other attaching member clamped in place thereupon. The yieldable connection between the buffer front members may be forced or moved into the proper position, the clamping connector bolts such as 12, 13, 14 being preferably tight enough even before such adjustment to hold the parts without any considerable shaking or looseness, although by forcing or pushing the buffer ends inward or outward the buffer width may of course be adjusted. Then the clamping devices, one of which may be loosely arranged around the buffer front strips may both be tightened to rigidly hold the buffer front members in alinement at these points, and the clamping connector bolts may be screwed home if desired to tighten the hinge joints in this yieldable connection.

Fig. 3 shows another arrangement in which a single strip of spring steel or the like may be bent up to form the buffer end loops and adjacent curved portions and attaching members 37, 38. The intermediate buffer front members 31, 35 which may be integral with the end loops may be formed, if desired, with one or more integral yieldable resilient loop connections such as the rearwardly extending loop connection 33 having the curved portions 32, 34, joining it to the buffer front member proper. This entire buffer element may thus be formed of a single piece of resilient steel strip or the like and under proper conditions may be sufficiently adjusted in width to accommodate different width automobile frame members throughout a considerable range. The attaching members 38 may be successively clamped or preferably loosely attached to the automobile frame members and then in any suitable way the buffer front members may be forced together or extended as may be required to bring them into proper position in which they may be held by any suitable clamping or connecting devices, in connection with one or more front reinforcing strips or members such as the channel section buffer front member 28, which preferably as indicated in Fig. 4, may have stiffening alining flanges 41, 42 more or less embracing or alining the adjacent front members. The ends 29, 30 of this front reinforcing member may extend outward to any suitable extent and the adjacent portions may, if desired, be formed with bolt holes to accommodate the shanks of the connecting bolts such as 39 passing, if desired, through adjusting holes or slots such as 34 in the buffer front members 31 and 35 behind. When the nuts 40 are tightened all these buffer front elements are of course securely and rigidly held in desired position so that subsequent lateral movement or undesirable rattling of the parts is practically prevented.

This invention has been described in connection with a number of embodiments, forms, proportions, parts, arrangements, materials, methods of connection and use, to the details of which disclosure the invention is not of course to be limited, since what is claimed as new and what is desired to be secured by Letters Patent is set forth in the appended claims:

1. The automobile buffer comprising attaching members, end loops adapted to extend into protective position adjacent the vehicle wheels and connected buffer front members having a rearwardly extending yieldable resilient loop connection, all of said parts being formed of a single strip of resilient spring steel, a front reinforcing member and connecting devices adapted to clamp said front reinforcing member in front of said buffer front member to firmly hold in adjusted position the parts of said buffer front member on either side of said yieldable connection.

2. The automobile buffer comprising end loops adapted to extend into protective position adjacent the vehicle wheels and connected buffer front members having a rearwardly extending yieldable resilient loop connection, all of said parts being formed of a single strip of resilient spring steel, a front reinforcing member and connecting devices adapted to hold in adjusted position the parts of said buffer front member on either side of said yieldable connection.

3. The automobile buffer comprising end loops adapted to extend into protective position adjacent the vehicle wheels and connected buffer front members having a yieldable resilient connection, all of said parts being formed of a single strip of resilient spring steel, and devices adapted to hold in adjusted position the parts of said buffer front member on either side of said yieldable connection.

4. The vehicle buffer comprising end loops adapted to extend into protective position adjacent the vehicle wheels and buffer front members integral with said end loops, said buffer front members having an adjustable width resilient loop connection, all of said parts being formed of a single resilient strip, attaching members and devices adapted to firmly hold in adjusted position the parts of said buffer front member on either side of said adjustable connection.

5. The vehicle buffer comprising buffer front members, said buffer front members having an adjustable width loop connection, all of said parts being formed of a single resilient strip and devices adapted to firmly hold in adjusted position the parts of said buffer front member on either side of said adjustable connection.

6. The automobile buffer comprising attaching members, end loops adapted to extend into protective position adjacent the vehicle wheels and buffer front members integral with said end loops, said buffer front members having a yieldable connection adapted to permanently connect and vertically aline the adjacent parts of said front members, a front reinforcing member having flanged alining means and connecting devices adapted to engage said reinforcing front member to aline and hold in adjusted position the parts of said buffer front member on either side of said yieldable connection.

7. The automobile buffer comprising end loops adapted to extend into protective position adjacent the vehicle wheels and buffer front members integral with said end loops, said buffer front members having a yieldable connection adapted to permanently connect and vertically aline the adjacent parts of said front members, a front reinforcing member and connecting devices adapted to engage said reinforcing front member to aline and hold in adjusted position the parts of said buffer front member on either side of said yieldable connection.

GEORGE ALBERT LYON.